(12) United States Patent
Dimitrovski et al.

(10) Patent No.: US 12,477,347 B2
(45) Date of Patent: Nov. 18, 2025

(54) OBTAINING SAMPLES FOR LEARNING-BASED RESOURCE MANAGEMENT BY ADJUSTING FLOW CHARACTERISTICS

(71) Applicants: Koninklijke KPN N.V., Rotterdam (NL); Nederlandse Organisatie Voor Toegepast-Natuurwetenschappelijk Onderzoek TNO, The Hague (NL)

(72) Inventors: Toni Dimitrovski, Boskoop (NL); Remco Litjens, Voorschoten (NL); Apoorva Arora, Delft (NL); Haibin Zhang, Voorburg (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 293 days.

(21) Appl. No.: 18/251,979

(22) PCT Filed: Nov. 4, 2021

(86) PCT No.: PCT/EP2021/080582
§ 371 (c)(1),
(2) Date: May 5, 2023

(87) PCT Pub. No.: WO2022/101080
PCT Pub. Date: May 19, 2022

(65) Prior Publication Data
US 2023/0413063 A1    Dec. 21, 2023

(30) Foreign Application Priority Data

Nov. 10, 2020 (EP) .................................. 20206693
Nov. 30, 2020 (EP) .................................. 20210544

(51) Int. Cl.
*H04W 16/10* (2009.01)
*H04W 28/02* (2009.01)

(52) U.S. Cl.
CPC ....... *H04W 16/10* (2013.01); *H04W 28/0268* (2013.01)

(58) Field of Classification Search
CPC ..... H04L 41/0896; H04L 43/50; H04L 43/55; H04L 41/16; H04L 41/145; H04W 28/0268; H04W 16/10
See application file for complete search history.

(56) References Cited

U.S. PATENT DOCUMENTS

| 2018/0270126 A1 | 9/2018 | Tapia |
| 2020/0127980 A1 | 4/2020 | Smith et al. |

(Continued)

FOREIGN PATENT DOCUMENTS

| CN | 111095870 A | 5/2020 |
| CN | 111542091 A | 8/2020 |
| WO | 2020190181 A1 | 9/2020 |

OTHER PUBLICATIONS

Gutterman, C., et al., "RAN Resource Usage Prediction for a 5G Slice Broker," Mobihoc Jul. 2-5, 2019, Catania, Italy (2019).

(Continued)

*Primary Examiner* — Muhammad N Edun
(74) *Attorney, Agent, or Firm* — Hamilton, Brook, Smith & Reynolds, P.C.

(57) ABSTRACT

A system (1, 21) for obtaining samples for a dynamic resource management system in a wireless network is configured to analyze (101) data for a dynamic resource management system to determine one or more combinations of input values which are not present or underrepresented in the data. The dynamic resource management system uses supervised learning to estimate resource demand. The system is further configured to adjust (103) one or more flow charac- (Continued)

teristics of a data flow between a user device and a base station to obtain one of the combinations of input values, determine a quantity of resources used for the data flow and actual state and/or cell characteristics relevant to the data flow, create a new sample based on the used quantity of resources, the adjusted flow characteristics, and the actual state and/or cell characteristics, and store the new sample in the data.

17 Claims, 6 Drawing Sheets

(56) References Cited

U.S. PATENT DOCUMENTS

| | | | | |
|---|---|---|---|---|
| 2021/0235339 A1* | 7/2021 | Babaei | ................. | H04W 36/06 |
| 2022/0353922 A1* | 11/2022 | Rastegardoost | .. | H04W 56/0045 |

OTHER PUBLICATIONS

International Search Report and Written Opinion for International Application No. PCT/EP2021/080582, entitled "Obtaining Samples for Learning-Based Resource Management by Adjusting Flow Characteristics," consisting of 37 pages. Date of Mailing: Feb. 16, 2022.

Bega et al., "DeepCog: Cognitive Network Management in Sliced 5G Networks with Deep Learning", IEEE InfoCom 2019—IEEE Conference on Computer Communications, 2019, pp. 280-288.

Deep Vision Data, "Into The Deep: Synthetic Training data for machine learning systems", available online at: <https://synthetictrainingdata.com/>, 2023, pp. 1-12.

Ericsson, "Ericsson Mobility Calculator: Discover how to use the Ericsson Mobility Calculator", Available online at: <https://www.ericsson.com/en/reports-and-papers/mobility-report/mobility-calculator?up=2&bp=2&v=0&c=2>, retrieved on Jul. 10, 2025, pp. 1-3.

Jaipuria et al., "Deflating Dataset Bias Using Synthetic Data Augmentation", 2020 IEEE/CVF Conference on Computer Vision and Pattern Recognition Workshops (CVPRW), 2020, pp. 3344-3353.

Kortylewski et al., "Analyzing and Reducing the Damage of Dataset Bias to Face Recognition with Synthetic Data", 2019 IEEE/CVF Conference on Computer Vision and Pattern Recognition Workshops, 2019, pp. 2261-2268.

Paul Tiwald, "Tackling AI Bias At Its Sourcep—With Fair Synthetic Data (Fairness Series Part 4)", Mostly AI, available online at: <https://mostly.ai/blog/tackling-ai-bias-at-its-source-with-fair-synthetic-data-fairness-series-part-4>, May 7, 2020, pp. 1-12.

Zhang et al., "Long-Term Mobile Traffic Forecasting Using Deep Spatio-Temporal Neural Networks", arXiv:1712.08083v1 [cs.NI], Dec. 21, 2017, 10 pages.

Chinese Search Report for Application No. 2021800880283, dated Aug. 19, 2025.

* cited by examiner

OBTAINING SAMPLES FOR LEARNING-BASED RESOURCE MANAGEMENT BY ADJUSTING FLOW CHARACTERISTICS

This application is the U.S. National Stage of International Application No. PCT/EP2021/080582, filed Nov. 4, 2021, which designates the U.S., published in English, and claims priority under 35 U.S.C. § 119 or 365 (c) to European Application No. 20210544.1, filed Nov. 30, 2020 and to European Application No. 20206693.2, filed Nov. 10, 2020. The entire teachings of the above applications are incorporated herein by reference.

FIELD OF THE INVENTION

The invention relates to a system for obtaining samples for a dynamic resource management system in a wireless network, the dynamic resource management system using supervised learning to estimate resource demand.

The invention further relates to a method of obtaining samples for a dynamic resource management system in a wireless network, the dynamic resource management system using supervised learning to estimate resource demand.

The invention also relates to a computer program product enabling a computer system to perform such methods.

BACKGROUND OF THE INVENTION

In mobile communication networks, resources are allocated dynamically to user devices. For example, in 5G, the base station (gNodeB) runs a scheduler which assigns resource blocks to different user devices (UEs), e.g. every millisecond. It may also be possible to dynamically assign resources to slices and/or cells. 5G network slicing, for example, is a network architectural feature that enables the multiplexing of virtualized and independent logical networks on the same physical network infrastructure. A slice may involve one cell or multiple cells. The utilization of resources can be optimized by dynamically assigning resources to different slices.

Often, the resource assignment decision is based on a forecast of the resource demand imposed by (a class of) users or applications. Machine learning may be used to predict this resource demand. For example, the paper "RAN Resource Usage Prediction for a 5G Slice Broker" by Craig Gutterman et al., in Mobihoc '19: Proceedings of the Twentieth ACM International Symposium on Mobile Ad Hoc Networking and Computing, July 2019, describes the use of machine learning to make a time-series prediction, wherein historical information is used to predict the resource demand of the future time steps.

Although time-series prediction works well in scenarios where time dependency can be observed, it cannot be effectively applied in predicting for rare infrequently occurring scenarios. In such cases, supervised machine learning models such as artificial neural networks can be used to make predictions of resource demand based on observable network factors such as service requirements, wireless channel conditions, interference levels and cell load.

The supervised machine learning models learn to make predictions based on a set of labelled observations. This set, also referred to as data or training data dictates to a great extent how accurate the model predictions will be. In general, the data must be abundant, diverse and unbiased to enable the model to give good predictions. Furthermore, the data must be sufficiently representative of the scenarios for which the derived model is expected to make predictions. Good generalization does help in these cases, but it is a well-known fact that finding a model that does not overfit to the data is at odds with finding a model that captures all essential characteristics of the data. Thus, adequate generalization is a known and difficult problem in deriving machine learning models. Furthermore, a high bias in data or training data may result in underfitting, causing a derived machine learning model to potentially miss relevant relations between observation variables and target outputs.

SUMMARY OF THE INVENTION

It is a first objective of the invention to provide a system, which can be used to improve data for supervised learning-based estimation of resource demand.

It is a second objective of the invention to provide a method, which can be used to improve data for supervised learning-based estimation of resource demand.

In a first aspect of the invention, a system for obtaining samples for a dynamic resource management system in a wireless network, the dynamic resource management system using supervised learning to estimate resource demand, comprises at least one processor configured to analyze data for the dynamic resource management system to determine one or more combinations of input values which are not present or underrepresented in the data, the data comprising a plurality of samples, each of the samples comprising flow characteristics and state and/or cell characteristics as input values and a quantity of resources as output value.

The at least one processor is further configured to adjust one or more flow characteristics of a data flow between a user device and a base station to obtain one of the one or more combinations of input values which are not present or underrepresented in the data, determine a quantity of resources used for the data flow and actual state and/or cell characteristics relevant to the data flow, create a new sample based on the used quantity of resources, the adjusted flow characteristics, and the actual state and/or cell characteristics, and store the new sample in the data.

This system makes it possible to handle part of the traffic corresponding to a given sufficiently present second application scenario (corresponding to a combination of input values), as if it corresponds to another insufficiently present first application scenario, i.e. the application scenario for which the data samples are needed for training purposes. The first application scenario may, for example, comprise an application that makes up too small a fraction of the total handled traffic (e.g. an application that requires a delay-critical guaranteed bit rate flow), a yet unused application projected for future use, or a more commonly used application but now with an associated uncommon Quality of Service (QoS) requirement or other flow characteristic.

In order to obtain better data, the traffic of the second application scenario may be handled differently than intended by e.g. the scheduler at the base station, in order to mimic the treatment of a flow corresponding to the first application scenario. As a concrete example, the adjusted traffic handling may entail a QoS-aware scheduler temporarily overriding the actual QoS requirements associated with the present flow of the second application scenario by those associated with the first application scenario of interest. With this approach, samples may be obtained during operational use of the wireless network while no additional, artificial traffic needs to be created, which might have affected subscribers more. The data may be training data and the samples may be training samples.

The data flow may be initiated, for example, by the user device or by a core network function, e.g. the SMF, UPF or AMF. The data flow may be a 5G Quality of Service (QoS) flow, for example. Preferably, the adjusted flow characteristics are similar to the unadjusted flow characteristics and comprise QoS requirements that are more or equally stringent than the QoS requirements comprised in the unadjusted flow characteristics.

The quantity of resources comprised in the samples as output value may be specified per data flow, e.g. as number of physical resource blocks (PRBs) per data flow. In this case, the supervised learning may be used to estimate the resource demand per data flow and this resource demand per data flow may then be used, for example, to estimate the resource demand per slice or cell, e.g. using aggregation methods. If there are many data flows with low-latency requirements in the same time interval, the sum of the resource demands of the simultaneous flows may be multiplied with a multiplication factor, which may depend on state and/or cell characteristics, or a certain amount of margin may be added to the sum, to obtain the resource demand per slice or cell. The estimated resource demand per slice or cell may then be assigned to the slices or cells, e.g. using reinforcement learning methods.

A current and/or future resource demand may be estimated. An estimation of future resource demand is also referred to as a predicted resource demand. The resource demand prediction and resource assignment may be performed periodically and/or may be triggered by certain events. For example, the resource demand prediction and resource assignment may be performed periodically on a timescale of (milli)seconds, minutes or even higher. The supervised learning process may involve training a neural network, for example. The PRBs allocated by the scheduler to a data flow may be assumed to be the PRBs used for the data flow, although not all PRBs assigned to uplink traffic may always be used in practice, e.g. due to the transmit power limit of the device.

The data flow may be an existing data flow or a new data flow. The flow characteristics may include a Quality of Service class selected from a plurality of Quality of Service classes. The plurality of Quality of Service classes may include one or more of: non-guaranteed bit rate, non-delay-critical guaranteed bit rate, and delay-critical guaranteed bit rate, for example. The plurality of Quality of Service classes may be 5G 5QI classes, for example.

The at least one processor may be configured to select a plurality of characteristics from the flow characteristics and the state and/or cell characteristics for each of the plurality of Quality of Service classes based on the respective Quality of Service class, the selected plurality of characteristics including the respective Quality of Service class, and determine the one or more combinations of input values by determining per Quality of Service class whether a combination of the selected characteristics is not present or underrepresented in the data. For example, RSRP, average neighboring cell load, and experienced throughput may be selected for non-guaranteed bit rate and non-delay-critical guaranteed bit rate data flows, and RSRP, average neighboring cell load, experienced throughput, and experienced latency may be selected for delay-critical guaranteed bit rate data flows.

The at least one processor may be configured to determine per Quality of Service class whether a combination of the selected characteristics is not present or underrepresented in the data by determining per Quality of Service class how many of the samples have a combination of the selected characteristics that deviate less than a certain amount from each other, e.g. a certain percentage like 25% or 33%. The range of values that a characteristic may assume may be partitioned (manually or automatically) in a certain number of groups, e.g. of equal size, and values in the same group may be considered to deviate less than a certain amount from each other. As a first example, if none of the samples for a QoS class "delay-critical guaranteed bit rate" has an RSRP of −60 dBm, an average neighboring cell load of 80%, an experienced throughput of 20 Mb/s, and an experienced latency of 75 ms, a QoS class of a new or existing data flow may be adjusted from "non-guaranteed bit rate" to "delay-critical guaranteed bit rate" if the actual RSRP is −60 dBm, or optionally close to −60 dBm, and the actual average neighboring cell load is 80%, or optionally close to 80%.

As a second example, if none of the samples for a QoS class "delay-critical guaranteed bit rate" has an RSRP between −50 and −70 dBm, an average neighboring cell load between 65% and 85%, an experienced throughput between 15 and 25 Mb/s, and an experienced latency between 60 and 90 ms, a QoS class of a new or existing data flow may be adjusted from "non-guaranteed bit rate" to "delay-critical guaranteed bit rate" if the actual RSRP is between −50 and −70 dBm and the average neighboring cell load is between 65% and 85%. As a third example, if none of the samples for a QoS class "delay-critical guaranteed bit rate" has an RSRP between −50 and −70 dBm, an average neighboring cell load between 65% and 85%, an experienced throughput between 15 and 25 Mb/s, and an experienced latency between 60 and 90 ms, a QoS class of a new or existing data flow may be adjusted from "non-guaranteed bit rate" to "delay-critical guaranteed bit rate" without considering the actual RSRP and the actual average neighboring cell load. In the third example, flow characteristics of data flows will need to be adjusted more often than in the first and second examples.

The quantity of resources comprised in the samples as output value may be specified per time interval and per slice and/or cell and the flow characteristics may comprises one or more values indicative of at least a number of data flows per Quality of Service class in the time interval. Instead of using supervised learning to estimate a resource demand per data flow and then estimating the resource demand per slice or cell based on this resource demand per data flow in a different manner (e.g. using aggregation methods), the supervised learning may be used to directly estimate the resource demand per slice and/or cell or even to directly determine a resource assignment per slice and/or cell.

In this case, performance metrics may additionally be included as output values in the samples in order to be able to specify a loss function that includes those performance metrics to allow performance to be improved. Slice utilization and quantity of rejected flows per slice are examples of such performance metrics. If a certain combination of quantities of data flows per QoS class in the same time interval is not represented or not represented sufficiently in the samples, flow characteristics may be adjusted to obtain these samples.

The state and/or cell characteristics may include one or more values indicative of one or more of wireless channel conditions, interference levels, throughput, latency, antenna direction, scheduler parameters, and duplex mode. Wireless channel conditions, interference levels, throughput, and latency are examples of state characteristics. Antenna direction, scheduler parameters, and duplex mode (e.g. FDD/TDD) are examples of cell characteristics. An average neighboring cell load is an example of a value indicative of interference levels. RSRP is an example of a value indicative of wireless channel conditions.

The at least one processor may be configured to cause the adjustment of at least one of the flow characteristics by transmitting a request to a core network function to use the at least one adjusted flow characteristic. This may be used to ensure that the core network function, and thereby e.g. the corresponding application, is aware of the Quality of Service actually applied.

The system may comprise a controller and the base station, the controller comprising a first processor and the base station comprising a second processor, the first processor being configured to determine the one or more combinations of input values which are not present or underrepresented in the data and inform the base station of the one or more combinations, and the second processor being configured to adjust the one or more flow characteristics of the data flow to obtain one of the one or more combinations of input values which are not present or underrepresented in the data.

As a first example, the controller specifies which adjustments to make and the base station merely complies with this request for all subsequent flows that match the adjustments. As a second example, the controller merely informs the base station of the one or more combinations and adjustments and the base station decides in which case(s) to perform the adjustment. For example, if the adjustment is from "non-guaranteed bit rate" to "delay-critical guaranteed bit rate", the base station can decide to perform the adjustment only in 10% of all data flows that require a "non-guaranteed bit rate". The reason for doing this might be to avoid creating too many data samples that are based on adjusting the flow characteristics, which might result in introducing opposite bias.

The second processor may be configured to transmit a message to the user device informing the user device to temporarily use an adjusted flow characteristic for the data flow, the adjusted flow characteristic being comprised in the one or more adjusted flow characteristics. The message may comprise a time interval during which a rule associated with the adjusted flow characteristic is to be used by the user device. Temporary adjustment may be beneficial to reduce the impact of collecting samples on used resources and/or the impact of reducing Quality of Service on a user experience.

The second processor may be configured to transmit a request to the user device, the request requesting permission to use the one or more adjusted flow characteristics, receive a response to the request, and adjust the one or more flow characteristics in dependence on the response being affirmative. This may be beneficial if a Quality of Service requirement needs to be relaxed to obtain a desired sample, for example.

In a second aspect of the invention, a user device for use with, or interacting with the above-described system comprises at least one processor configured to receive a message from the base station, the message requesting permission from the user device to use an adjusted flow characteristic for a data flow or informing the user device to temporarily use the adjusted flow characteristic for the data flow, and use a rule associated with the adjusted flow characteristic.

In a third aspect of the invention, a method of obtaining samples for a dynamic resource management system in a wireless network, the dynamic resource management system using supervised learning to estimate resource demand, comprises analyzing data for the dynamic resource management system to determine one or more combinations of input values which are not present or underrepresented in the data, the data comprising a plurality of samples, each of the samples comprising flow characteristics and state and/or cell characteristics as input values and a quantity of resources as output value.

The method further comprises adjusting one or more flow characteristics of a data flow between a user device and a base station to obtain one of the one or more combinations of input values which are not present or underrepresented in the data, determining a quantity of resources used for the data flow and actual state and/or cell characteristics relevant to the data flow, creating a new sample based on the used quantity of resources, the adjusted flow characteristics, and the actual state and/or cell characteristics, and storing the new sample in the data. The data may be training data and the samples may be training samples. The method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the first software code portion, when executed or processed by a computer, being configured to perform executable operations for obtaining samples for a dynamic resource management system in a wireless network, the dynamic resource management system using supervised learning to estimate resource demand.

The executable operations comprise obtaining samples for a dynamic resource management system in a wireless network, the dynamic resource management system using supervised learning to estimate resource demand, comprises analyzing data for the dynamic resource management system to determine one or more combinations of input values which are not present or underrepresented in the data, the data comprising a plurality of samples, each of the samples comprising flow characteristics and state and/or cell characteristics as input values and a quantity of resources as output value.

The executable operations further comprise adjusting one or more flow characteristics of a data flow between a user device and a base station to obtain one of the one or more combinations of input values which are not present or underrepresented in the data, determining a quantity of resources used for the data flow and actual state and/or cell characteristics relevant to the data flow, creating a new sample based on the used quantity of resources, the adjusted flow characteristics, and the actual state and/or cell characteristics, and storing the new sample in the data.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

It is beneficial to collect data for a resource management system which uses supervised learning from actual wireless/mobile network traffic handling. Although abundant collection of data is generally possible, the majority of the wireless/mobile traffic is associated with a limited set of applications, including video streaming (about 63%), web applications (social networking, browsing, navigation; about 19%), audio streaming, messaging and file downloads.

A poor data set for supervised learning is characterized by being insufficiently extensive (containing insufficient data points to adequately represent the given problem scenario) and/or by including biased or non-representative data. A lack of sufficient data points leads to a high variability in model predictions for a given input; even if the model may perfectly fit (potentially even overfit) the data, it may then not provide adequate predictions for previously unseen data.

As a result of the majority of the wireless/mobile traffic being associated with a limited set of applications, the collected data would, in 5G, be biased for hardly represented (or not represented) URLLC-type or mMTC-type applications. Poorly represented cases may further include rare or even common applications with uncommon Quality of Service (QoS) requirements in terms of e.g. throughput, latency or reliability, or another uncommon application/flow characteristic, e.g. in terms of its duration or size.

The method described below makes it possible to create data or training data that includes sufficient data samples (wireless/mobile network statistics) for cases which are not represented or underrepresented in the total wireless/mobile traffic.

Figure 1:
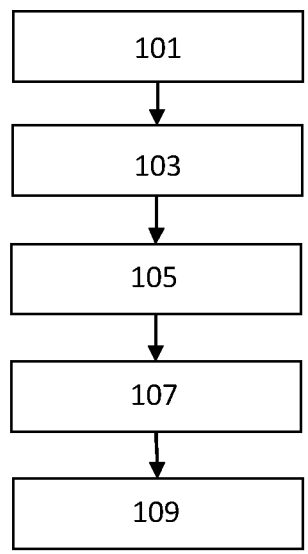
FIG. 1 is a flow diagram of a first embodiment of the method.

A first embodiment of the method of obtaining samples for a dynamic resource management system in a wireless network is shown in FIG. 1. The dynamic resource management system uses supervised learning to estimate resource demand. A step 101 comprises analyzing data for the dynamic resource management system to determine one or more combinations of input values which are not present or underrepresented in the data.

The data or training data comprises a plurality of samples. Each of the samples comprises flow characteristics and state and/or cell characteristics as input values and a quantity of resources as output value. The state and/or cell characteristics may include one or more values indicative of one or more of wireless channel conditions, interference levels, throughput, latency, antenna direction, scheduler parameters, and duplex mode, for example.

A step 103 comprises adjusting one or more flow characteristics, e.g. a QoS class, of a data flow between a user device and a base station to obtain one of the one or more combinations of input values which are not present or underrepresented in the data. A step 105 comprises determining a quantity of resources used for the data flow and actual state and/or cell characteristics relevant to the data flow.

A step 107 comprises creating a new sample or training sample based on the used quantity of resources, the adjusted flow characteristics, and the actual state and/or cell characteristics. A step 109 comprises storing the new sample in the data.

Figure 2:
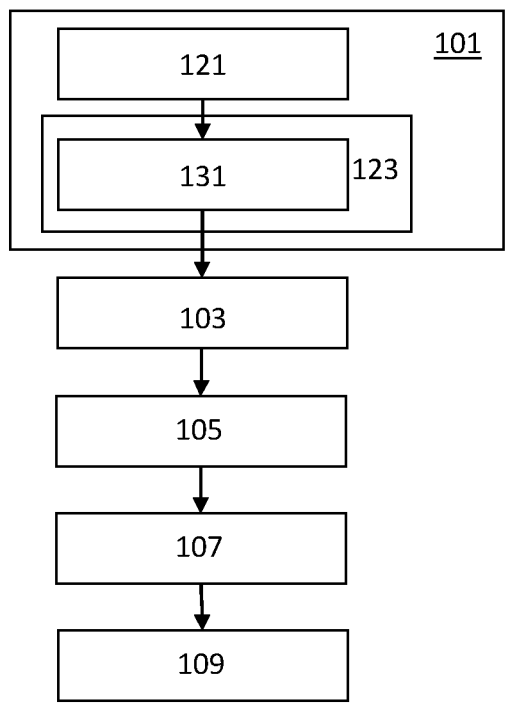
FIG. 2 is a flow diagram of a second embodiment of the method.

A second embodiment of the method of obtaining samples for a dynamic resource management system in a wireless network is shown in FIG. 2. This second embodiment is an extension of the first embodiment of FIG. 1. In the embodiment of FIG. 2, step 101 of FIG. 1 is implemented by steps 121 and 123. In the embodiment of FIG. 2, the flow characteristics include a Quality of Service (QoS) class selected from a plurality of Quality of Service classes. The plurality of Quality of Service classes may include one or more of non-guaranteed bit rate, non-delay-critical guaranteed bit rate, and delay-critical guaranteed bit rate, for example.

Step 121 comprises selecting a plurality of characteristics from the flow characteristics and the state and/or cell characteristics for each of the plurality of Quality of Service classes based on the respective Quality of Service class. The selected plurality of characteristics includes the respective Quality of Service class. An example of this selection will be described in relation to FIG. 4. Step 123 comprises determining per Quality of Service class whether one or more combinations of selected characteristics are not present or underrepresented in the data or training data and thereby determining the one or more combinations of input values.

In the embodiment of FIG. 2, step 123 is implemented by a step 131. Step 131 comprises determining per Quality of Service class how many of the samples have a combination of values of the selected characteristics that deviate less than a certain amount from each other. An example of this determination will be described in relation to FIG. 4.

Figure 3:
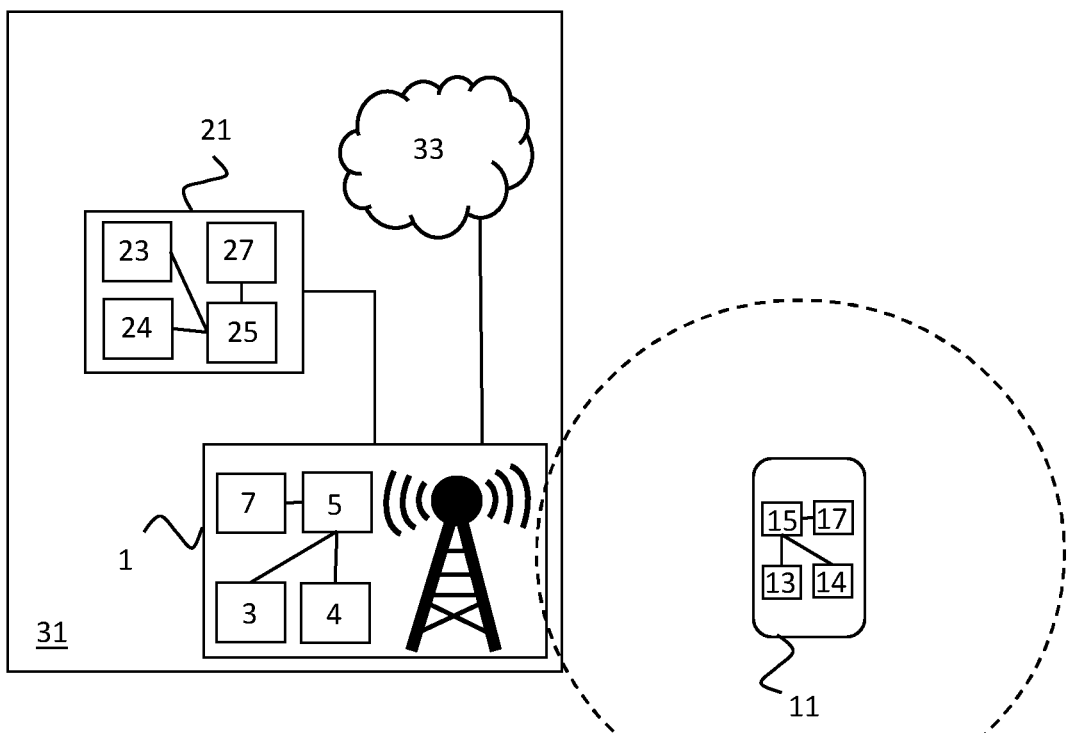
FIG. 3 is a block diagram of an embodiment of the system for obtaining samples.

FIG. 3 shows an embodiment of the system for obtaining samples for a dynamic resource management system in a wireless network. In this embodiment, the system comprises a base station 1 and a controller 21. The dynamic resource management system uses supervised learning to estimate resource demand. The wireless network 31 comprises the base station 1, the controller 21, and a core network 33. The wireless network 31 may be a 5G network, for example. The base station 1 may be a gNodeB, for example. In the embodiment of FIG. 3, the base station 1 comprises a single unit. In an alternative embodiment, the base station may comprise a central unit and one or more distributed units, for example.

The base station 1 comprises a receiver 3, a transmitter 4, a processor 5, and a memory 7. The controller 21 comprises a receiver 23, a transmitter 24, a processor 25, and a memory 27. In the embodiment of FIG. 3, the processor 25 is configured to analyze data for the dynamic resource management system to determine one or more combinations of input values which are not present or underrepresented in the data. The data comprises a plurality of samples and may be stored in the memory 27, for example. Each of the samples comprises flow characteristics and state and/or cell characteristics as input values and a quantity of resources as output value.

In the embodiment of FIG. 3, the processor 5 is configured to adjust one or more flow characteristics of a data flow between a user device and a base station to obtain one of the one or more combinations of input values which are not present or underrepresented in the data. Preferably, the adjusted flow characteristics are similar to the unadjusted flow characteristics and comprise QoS requirements that are more or equally stringent than the QoS requirements comprised in the unadjusted flow characteristics. The base station 1 is equipped with a QoS-aware scheduler and communicates with the core network 33 and the user device 11 to exchange information. Information on which adjustments to make may be stored in memory 7, for example.

The adjusted traffic handling may entail the QoS-aware scheduler temporarily overriding the actual QoS requirements associated with the present flow of a second application by those associated with a first application. With this approach, samples may be obtained during operational use of the wireless network while no additional, artificial traffic needs to be created, which might have affected subscribers more. The first application may, for example, be an application that makes up too small a fraction of the total handled traffic (e.g. an application that requires a delay-critical guaranteed bit rate flow), a yet unused application projected for future use, or a more commonly used application but now with an associated uncommon Quality of Service (QoS) requirement or other flow characteristic.

At least one of the processors 5 and 25 is configured to determine a quantity of resources used for the data flow and actual state and/or cell characteristics relevant to the data flow, create a new sample based on the used quantity of resources, the adjusted flow characteristics, and the actual state and/or cell characteristics, and store the new sample in the data, e.g. in memory 27 and/or in memory 7. The quantity of resources used for the data flow may be determined by the QoS aware scheduler running on the base station 1, for example.

The user device 11 comprises a receiver 13, a transmitter 14, a processor and a memory 17. In the embodiment of FIG. 3 or in an alternative embodiment, the processor 15 is configured to receive a message from the base station 1 which requests permission from the user device 11 to use an adjusted flow characteristic for a data flow or informs the user device 11 to temporarily use the adjusted flow characteristic for the data flow. The processor 15 is further configured to use a rule associated with the adjusted flow characteristic.

In the embodiment shown in FIG. 3, the base station 1 comprises one processor 5. In an alternative embodiment, the base station 1 comprises multiple processors. The processor 5 of the base station 1 may be a general-purpose processor, e.g. an Intel or an AMD processor, or an application-specific processor, for example. The processor 5 may comprise multiple cores, for example. The processor 5 may run a Unix-based or Windows operating system, for example. The memory 7 may comprise solid state memory, e.g. one or more Solid State Disks (SSDs) made out of Flash memory, or one or more hard disks, for example.

The receiver 3 and the transmitter 4 may use one or more cellular communication technologies such as GPRS, CDMA, UMTS, LTE, and/or 5G New Radio to communicate with user device 11, for example. The receiver 3 and the transmitter 4 may use one or more wired communication technologies to communicate with the controller 21 and the core network 33, for example. The receiver 3 and the transmitter 4 may be combined in a transceiver. Base station 1 may comprise other components typical for a base station in a mobile communication network, e.g. a power supply.

In the embodiment shown in FIG. 3, the controller 21 comprises one processor 25. In an alternative embodiment, the controller 21 comprises multiple processors. The processor 25 of the controller 21 may be a general-purpose processor, e.g. an Intel or an AMD processor, or an application-specific processor, for example. The processor 25 may comprise multiple cores, for example. The processor 25 may run a Unix-based or Windows operating system, for example. The memory 27 may comprise solid state memory, e.g. one or more Solid State Disks (SSDs) made out of Flash memory, or one or more hard disks, for example.

The receiver 23 and the transmitter 24 may use one or more wired communication technologies to communicate with the base station 1 for example. The receiver 23 and the transmitter 24 may be combined in a transceiver. Controller 21 may comprise other components typical for a function in a mobile communication network, e.g. a power supply.

In the embodiment of FIG. 3, the controller 21 is a separate network node and is located outside the core network 33. In an alternative embodiment, the controller 21 is located at the base station 1 or located in the core network 33 as a function. In the embodiment shown in FIG. 3, the controller 21 is a single, stand-alone device. In another embodiment, the controller 21 may comprise multiple devices and/or may be combined with another function in a mobile communication network, e.g. a base station.

A user device may also be referred to by those skilled in the art as a mobile station (MS), a subscriber station, a mobile unit, a subscriber unit, a wireless unit, a wireless terminal, a wireless device, a wireless communications device, a remote device, a mobile subscriber station, an access terminal (AT), a mobile terminal, a user equipment (UE), a remote terminal, a handset, a terminal, a user agent, a mobile client, a client, or some other suitable terminology.

Examples of a wireless terminal include a cellular phone, a smart phone, a session initiation protocol (SIP) phone, a laptop, a notebook, a netbook, a smartbook, a personal digital assistant (PDA), a tablet computer, a satellite radio, a global positioning system (GPS) device, a multimedia device, a video device, a digital audio player, a camera, a game console, or any other similar functioning device. A user device may have a slot for a UICC (also called a SIM card) or be provisioned with an embedded or enhanced version thereof for storage of credentials, for example.

In the embodiment shown in FIG. 3, the user device 11 comprises one processor 15. In an alternative embodiment, the user device 11 comprises multiple processors. The processor 15 may be a general-purpose processor, e.g. an ARM or Qualcomm processor, or an application-specific processor. The processor 15 may run Google Android or Apple iOS as operating system, for example.

The receiver 13 and the transmitter 14 of the user device 11 may use one or more cellular communication technologies such as GPRS, CDMA, UMTS, LTE, and/or 5G New Radio to communicate with the base station 1, for example. The receiver 13 and the transmitter 14 may be combined in a transceiver. The user device 11 may comprise other components typical for a user device, e.g. a display and a battery. The user device 11 may be a mobile phone, for example.

Figure 4:
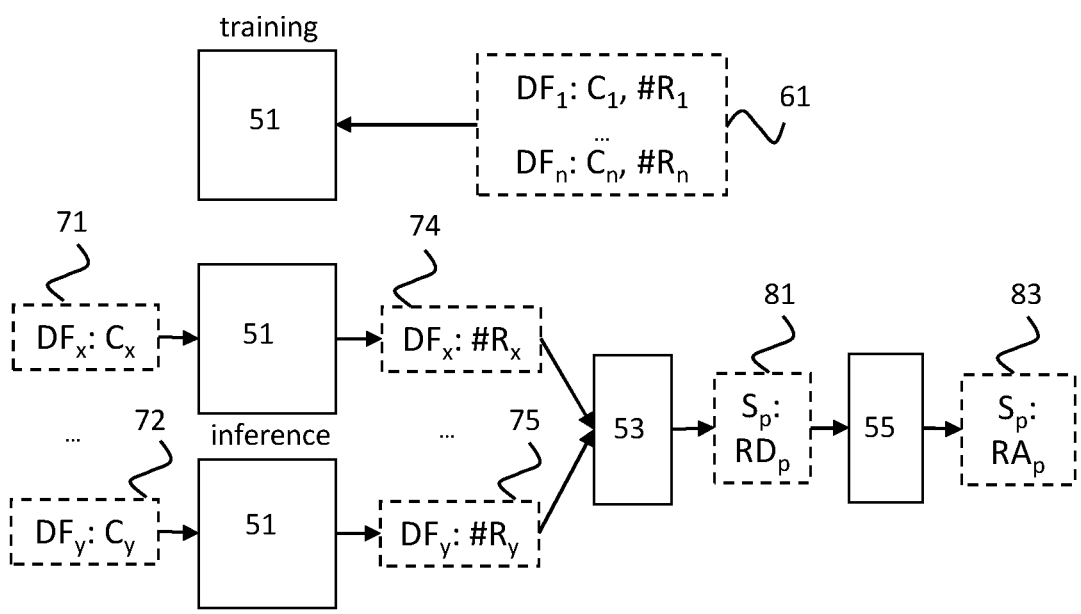
FIG. 4 shows a first example of the dynamic resource management system.

FIG. 4 shows a first example of the dynamic resource management system. In this first example, the dynamic resource management system comprises a neural network 51. The neural network 51 is trained with samples per data flow, each sample corresponding to one data flow. Each sample comprises characteristics (input values) and a quantity of resources (an output value) per data flow. FIG. 4 depicts data 61, which comprises characteristics C and a quantity of resources #R per data flow for data flows $DF_1$ to $DF_n$.

Exemplary samples of the data 61 are shown in Table 1. The samples shown in Table 1 are for six data flows of six different user devices that are established at six different times (i.e. not simultaneously). The flow characteristics shown in Table 1 include a Quality of Service class selected from a plurality of Quality of Service classes. The QoS requirement of the data flow is delay-sensitive (DS) or delay-tolerant (DT) with or without a minimum guaranteed throughput requirement (GBR/non-GBR). The assigned radio resources are specified as quantity of Physical Resource Blocks (PRBs).

TABLE 1

| RSRP (dBm) | Average neighboring cell load | Experienced throughput (Mb/s) | Experienced latency (ms) | QOS class | Radio Resources assigned |
|---|---|---|---|---|---|
| −60 | 40% | 5 | 50 | DT/GBR | 10 |
| −75 | 10% | 55 | 200 | DT/non-GBR | 55 |
| −100 | 90% | 7 | 150 | DT/non-GBR | 26 |
| −70 | 80% | 1 | 20 | DS/GBR | 8 |
| −80 | 30% | 23 | 10 | DS/non-GBR | 2 |
| −110 | 47% | 2 | 139 | DT/non-GBR | 15 |

As described with respect to step 121 of FIG. 2, a plurality of characteristics may be selected from the flow characteristics and the state and/or cell characteristics for each of the plurality of Quality of Service classes based on the respective Quality of Service class. For example, RSRP, average neighboring cell load, and experienced throughput may be selected for the non-GBR and DT/GBR data flows, and RSRP, average neighboring cell load, experienced throughput, and experienced latency may be selected for the DS/GBR data flows.

As described with respect to step 123 of FIG. 2, it may then be determined per Quality of Service class how many of the samples have a combination of the selected characteristics that deviate less than a certain amount from each other. For example, an experienced throughput rounded down to 45 Mb/s may be considered to deviate more than the certain amount from an experienced throughput rounded down to 44 Mb/s. Alternatively, the range of values that a characteristic may assume may be partitioned (manually or automatically) in a certain number of groups, e.g. of equal size, and values in the same group may be considered to deviate less than a certain amount from each other.

As an example of the latter, if the above Table 1 would comprise all samples, none of the samples for the QoS class DS/GBR would have an RSRP between −90 and −110 dBm, an average neighboring cell load between 85% and 100%, an experienced throughput between 0 and 10 Mb/s, and an experienced latency between 60 and 90 ms, so a QoS class of a new or existing data flow may be adjusted from DT/non-GBR to DS/GBR if the actual RSRP is between −90 and −110 dBm and the average neighboring cell load is between 85% and 100%.

After the neural network 51 has been trained, it can be used in inference mode to estimate resource demand. The neural network 51 estimates resource demand per data flow. For each of a plurality of data flows $DF_x \ldots DF_y$ of a slice $S_p$, characteristics ($C_x \ldots C_y$) are provided as input values. The input values 71 for $DF_x$ and the input values 72 for $DF_y$ are depicted in FIG. 4. The neural network 51 then outputs, for each of the plurality of data flows, a quantity of resources ($\#R_x \ldots \#R_y$). The output value 74 for $DF_x$ and the output value 75 for $DF_y$ are depicted in FIG. 4.

The estimated resource demand for data flows $DF_x \ldots DF_y$ of slice $S_p$ is then provided to an aggregation function 53, which aggregates the resource demands, i.e. the quantities of resources, determined for the data flows. The sum of the resource demands of the simultaneous flows may be multiplied with a multiplication factor, which may depend on state and/or cell characteristics, or a certain amount of margin may be added to the sum, to obtain the resource demand per slice or cell. In this way, for the sake of performance guarantee, additional resources may be allocated to a slice to account for possible estimation errors in the demand estimation step. The possible estimation errors could be caused, for example, by insufficient training or inaccuracies in the modeling, e.g. suboptimal selection of input parameters and/or parameters of the machine-learning algorithms (e.g. the number of hidden layers and/or the number of neurons per layer).

The output of the aggregation function 53 is a resource demand 81 for slice $S_p$. This resource demand 81 is provided to a resource assignment function 55 along with resource demands for other slices (determined in a similar manner). This resource assignment function 55 assigns the resources to the slices based on the resource demand 81 and the resource demands for the other slices. The resource assignment function 55 may use reinforcement learning, for example. The output of the resource assignment function 55 is a resource assignment 83 for slice $S_p$ and resource assignments for the other slices.

Figure 5:
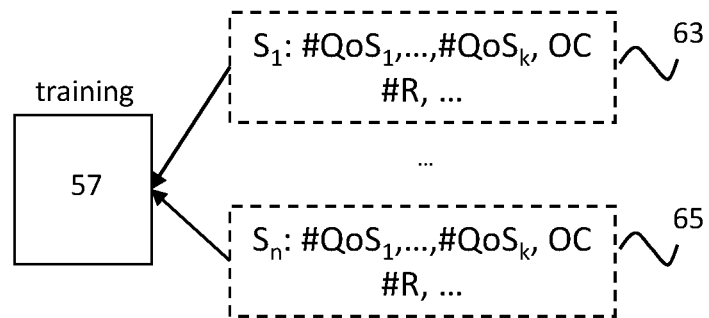
FIG. 5 shows a second example of the dynamic resource management system.
Figure 5:
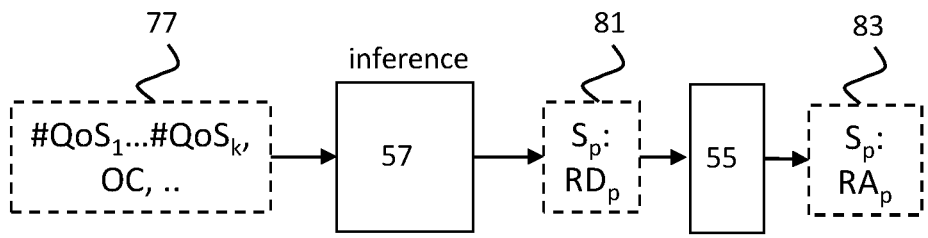

FIG. 5 shows a second example of the dynamic resource management system. In this second example, the dynamic resource management comprises a neural network 57. The neural network 57 is trained with samples per slice. Each sample comprises characteristics (input values) and a quantity of resources (an output value). FIG. 5 depicts samples for slice Si to Sn of which a sample 63 for slice Si and a sample 65 for slice Sn are shown in more detail in FIG. 5.

Each of the samples includes, as input values, a number of data flows per Quality of Service class in a certain time interval ($\#QoS_1, \ldots, \#QoS_k$) as part of the flow characteristics and other flow, state, and/or cell characteristics (OC). The other characteristics may include average RSRP and/or average neighboring cell load, for example. Each of the samples further includes, as output value, a quantity of resources (#R) used in the time interval for the respective slice.

An example of samples for the neural network 57 is shown in Table 2. The QoS requirement of the data flow is delay-tolerant (DT) with or without a guaranteed minimum throughput requirement (GBR/non-GBR) or delay-sensitive (DS) with a guaranteed minimum throughput requirement. The assigned radio resources are specified as quantity of Physical Resource Blocks (PRBs).

TABLE 2

| #flows DT/GBR | #flows DT/non-GBR | #flows DS/GBR | Average RSRP (dBm) | Average neighboring cell load | Avg. throughput (Mb/s) | Avg. latency (ms) | Radio Resources assigned |
|---|---|---|---|---|---|---|---|
| 15 | 31 | 0 | −60 | 42% | 16 | 50 | 697 |
| 24 | 45 | 0 | −75 | 55% | 35 | 200 | 745 |

TABLE 2-continued

| #flows DT/GBR | #flows DT/non-GBR | #flows DS/GBR | Average RSRP (dBm) | Average neighboring cell load | Avg. through put (Mb/s) | Avg. latency (ms) | Radio Resources assigned |
|---|---|---|---|---|---|---|---|
| 35 | 56 | 0 | −100 | 81% | 55 | 150 | 1104 |
| 21 | 35 | 1 | −70 | 59% | 31 | 20 | 779 |
| 10 | 40 | 2 | −80 | 66% | 7 | 10 | 854 |
| 39 | 59 | 0 | −110 | 90% | 60 | 139 | 1256 |

If the above Table 2 would comprise all samples, samples for slices with a substantial number of DS/GBR data flows would be underrepresented, so the QoS class of a few data flows may be adjusted from DT/non-GBR or DT/GBR to DS/GBR to obtain those samples.

After the neural network 57 has been trained, it can be used in inference mode to estimate resource demand. The neural network 57 estimates resource demand per slice. For a slice $S_p$, a number of data flows per Quality of Service class (#$QoS_1$, . . . , #$QoS_k$) and other flow, state, and/or cell characteristics (OC) are provided as input values 77 to the neural network 57. In the example of Table 2, these other characteristics include the average RSRP of all UEs on the cell and the average neighboring cell load. The neural network 57 then outputs the resource demand 81 for slice $S_p$.

This resource demand 81 is provided to a resource assignment function 55 along with resource demands for other slices, in the same manner shown in FIG. 4. The output of the resource assignment function 55 is a resource assignment 83 for slice $S_p$ and resource assignments for the other slices.

Figure 6:
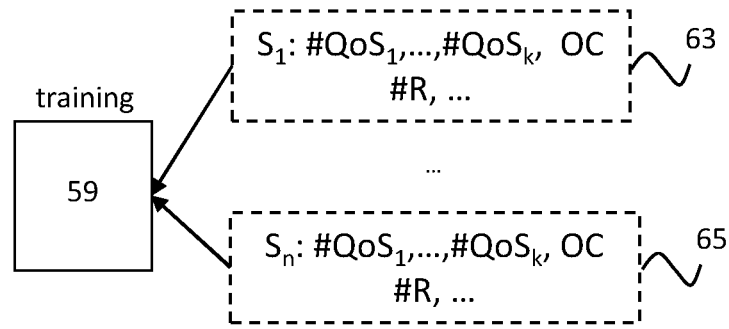
FIG. 6 shows a third example of the dynamic resource management system.
Figure 6:
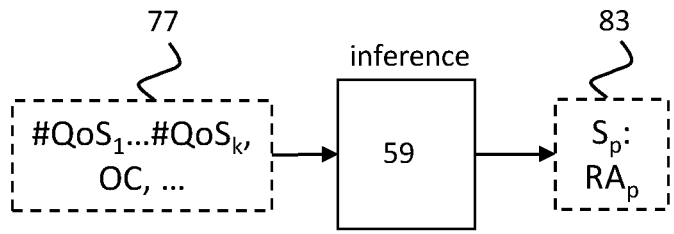

FIG. 6 shows a third example of the dynamic resource management system. In this third example, the dynamic resource management comprises a neural network 59. Like the neural network 57 of FIG. 5, the neural network 59 is trained with samples per slice. However, the neural network 59 outputs the resource assignment 83 for slice $S_p$ and resource assignments for the other slices, and a separate resource assignment function is therefore not needed. In this case, aside from the Radio Resources assigned output mentioned in Table 2, outputs related to the performance metrics need to be added in order to be able to specify a loss function that includes those so performance can be improved. Slice utilization and number of rejected flows per slice are examples of such performance metrics. These can also be used in the reward function of the resource assignment function of FIGS. 4 and 5 in case this function is based on reinforcement learning.

In the examples of FIGS. 4 to 6, resource demand is estimated per cell per slice and resources are assigned to slices for that cell. Alternatively, resource demand may be estimated per cell and resources may be assigned to cells even if slices are not used.

Figure 7:
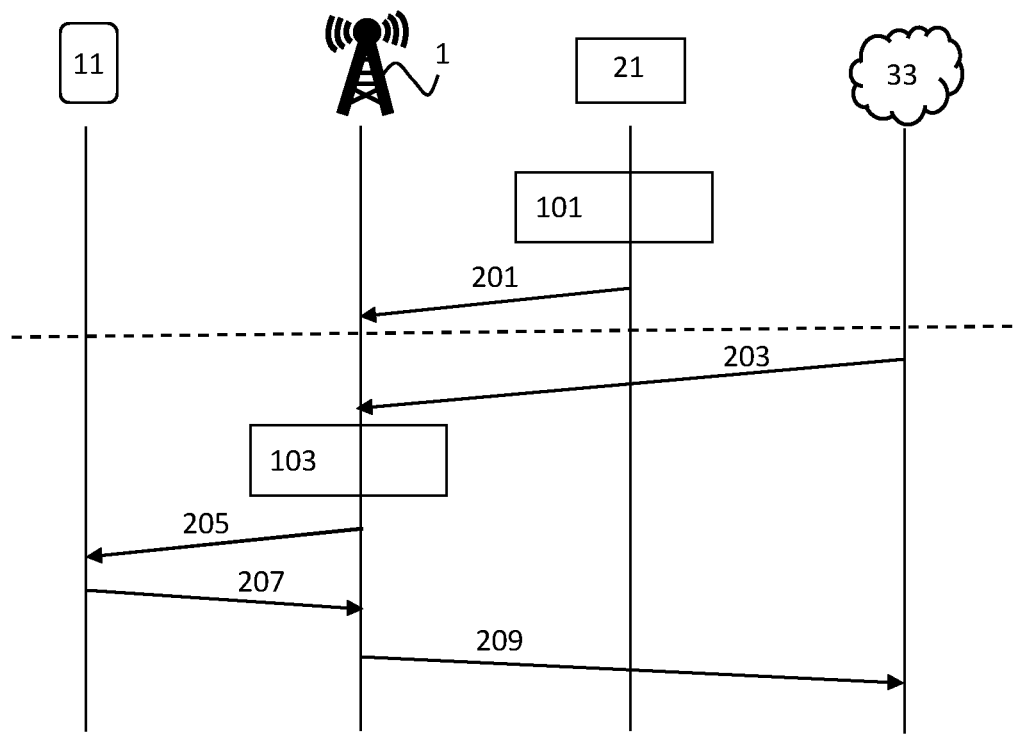
FIG. 7 shows a first example of an adjustment of flow characteristics of a network-initiated data flow.

FIG. 7 shows a first example of an adjustment of flow characteristics of a network-initiated data flow. First, the controller 21 determines the one or more combinations of input values which are not present or underrepresented in the data in step 101. In a first embodiment of the method, the controller 21 specifies which adjustments to make and the base station 1 merely complies with this request for all subsequent flows that match the adjustments.

In a second embodiment of the method, the controller 21 merely informs the base station 1 of the one or more combinations and adjustments and the base station 1 decides in which case(s) to perform the adjustment. For example, if the adjustment is from "non-guaranteed bit rate" to "delay-critical guaranteed bit rate", the base station 1 can decide to perform the adjustment only in 10% of all data flows that require a "non-guaranteed bit rate". The reason for doing this might be to avoid creating too many data samples that are based on adjusting the flow characteristics, which might result in introducing opposite bias.

In the example of FIG. 7, the controller 21 decides that data flows with a QoS1 class, which is associated with a first application, are underrepresented in the data and that the QoS1 class instead of a QoS2 class, which is associated with the second application, should be used for the second application. In this example, combinations of input values that include the QoS1 class, needs to be obtained. The controller 21 informs the base station 1 of these one or more combinations with message 201.

When the core network 33, e.g. a Session Management Function of the core network 33, transmits a message 203 to establish a QoS flow for the second application with QoS2, the base station 1 adjusts the QoS class of this QoS flow from QoS2 to QoS1 in step 103. Then, the base station 1 transmits a message 205 to the user device 11 to establish the QoS flow between the base station 1 and the user device 11. Message 205 may be an 5G NR RRCReconfiguration message, for example.

Message 205 may simply specify that rules associated with the QoS1 class are to be used and the user device 11 may then not even know that this QoS flow would normally have required the QoS2 class. Alternatively, message 205 may inform the user device 11 to temporarily use the QoS1 class for the QoS flow and afterwards use the normal QoS2 class for this QoS flow. In this case, message 205 may comprise a time interval during which a rule associated with the adjusted flow characteristic, i.e. the QoS1 class, is to be used by the user device. The latter may require a not yet standardized field in the RRCReconfiguration message.

Next, the user device 11 transmits a message 207 to the base station 1 to confirm the establishment of the QoS flow with the QoS1 class. The base station 1 then transmits a message 209 to the core network 33 to confirm the establishment of the QoS flow with the QoS2 class. Thus, the core network 33 is not aware of the adjustment of the flow characteristics in the example of FIG. 7.

The user device 11 receives and processes data of the second application following the rules associated with QoS1. Thus, the user device 11 applies resource mapping according to QoS1, instead of QoS2, and sends packets belonging to the flow uplink to the base station 1 accordingly. For example, different queues, different radio bearers, and/or different frequencies may be used for QoS1 traffic than for QoS2 traffic.

Figure 8:
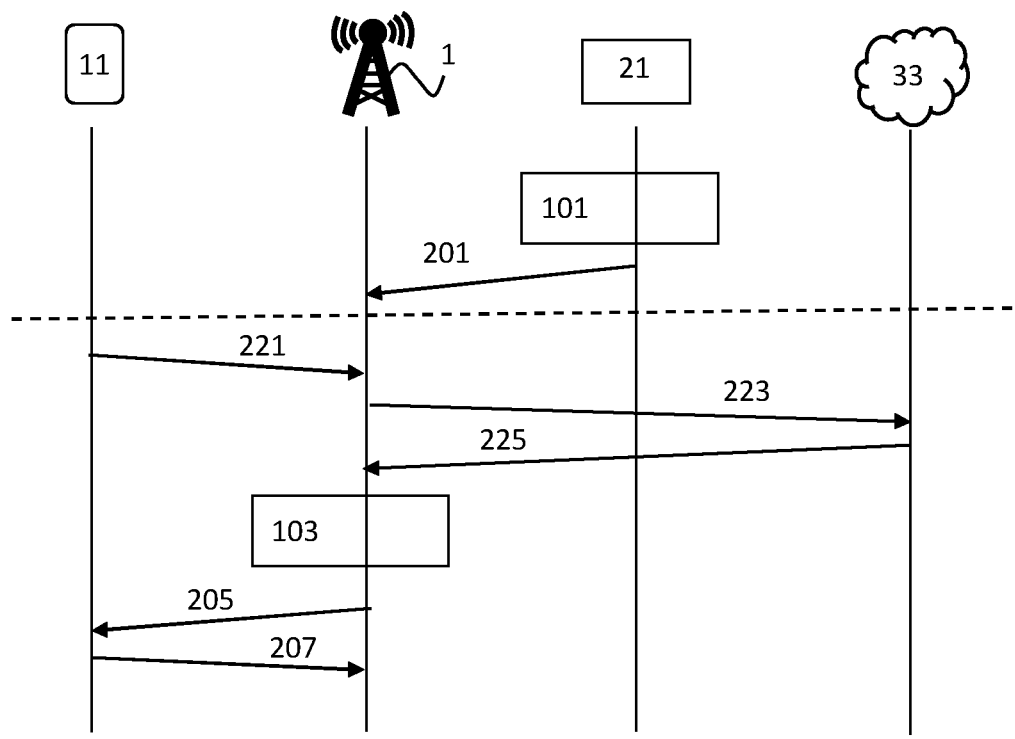
FIG. 8 shows a first example of an adjustment of flow characteristics of a user device-initiated data flow.

FIG. 8 shows a first example of an adjustment of flow characteristics of a user device-initiated data flow. Step 101 is performed and message 201 is transmitted in the same way in this example as in the example of FIG. 7. However, in this example of a user device-initiated data flow, it is the user device 11 that transmits a message 221 to establish a QoS flow for a second application with the QoS2 class.

The base station 1 then transmits a message 223 to the core network 33 to establish the QoS flow between the base station 1 and the core network 33 with the QoS2 class. Next, the core network 33 transmits a message 225 to the base station 1 to confirm the establishment of the QoS flow with the QoS2 class.

Next, the base station 1 adjusts the QoS class of the QoS flow between the base station 1 and the user device 11 from the QoS2 class to the QoS1 class in step 103 and the base station 1 transmits a message 205 to the user device 11 to establish the QoS flow with the adjusted QoS class, i.e. the QoS1 class instead of the QoS2 class, between the base station 1 and the user device 11. Then, the user device 11 transmits a message 207 to the base station 1 to confirm the establishment of the QoS flow with the QoS1 class.

Figure 9:
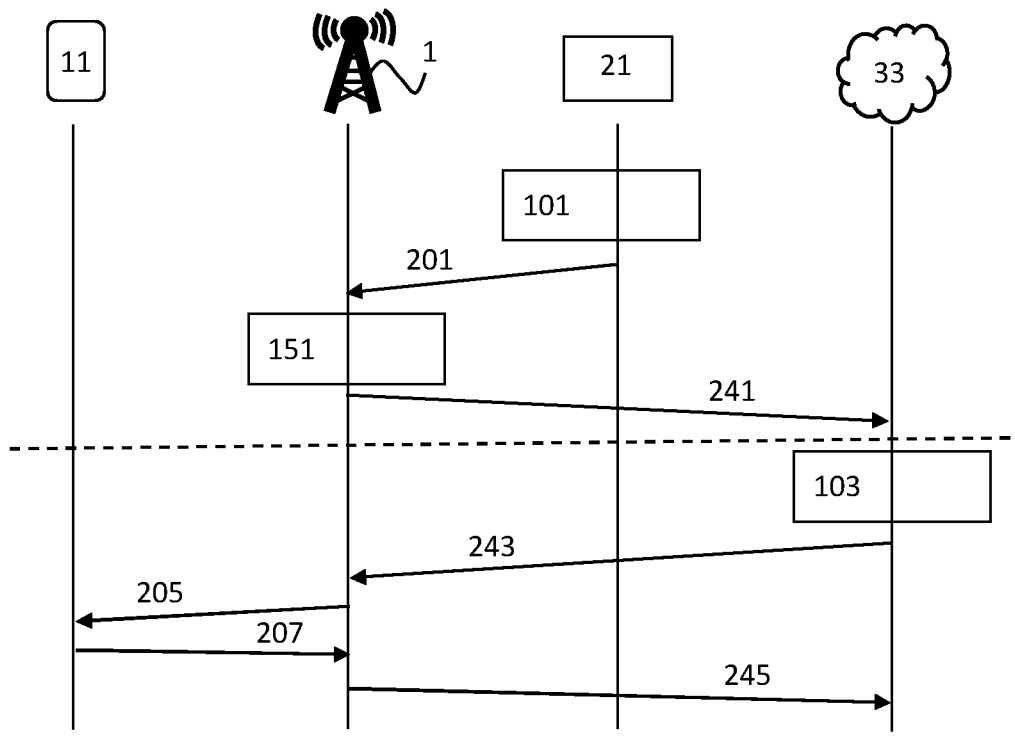
FIG. 9 shows a second example of an adjustment of flow characteristics of a network-initiated data flow.

FIG. 9 shows a second example of an adjustment of flow characteristics of a network-initiated data flow. Step 101 is performed and message 201 is transmitted in the same way in this example as in the example of FIG. 7. However, in this example, it is not the base station 1 that adjusts the QoS class itself, but the base station 1 causes the adjustment of the QoS class by transmitting, in a step 151, a request 241 to the core network 33, e.g. the Session Management Function (SMF) of the second application, to use the QoS1 class in certain cases.

The core network 33 then complies with this request in step 103 and later transmits a message 243 to establish a QoS flow for the second application with QoS1, thereby overriding the original QoS of the second application (QoS2) with the desired QoS of the first application (QoS1). After the QoS flow (with the QoS1 class) has been established between the base station 1 and the user device 11 with messages 205 and 207, the base station 1 transmits a message 225 to the core network 33 to confirm the establishment of the QoS flow with the QoS1 class. Thus, in this example, and in this embodiment of the method, the core network 33 is aware of the adjustment of the flow characteristics.

After the message exchanges depicted in FIG. 9, the core network 33 (e.g. the UPF as instructed by the SMF) sends downlink packets belonging to the flow of the second application, now associated with QoS1, to the base station 1, and optionally to other base stations in case the data is sent via multiple base stations.

Figure 10:
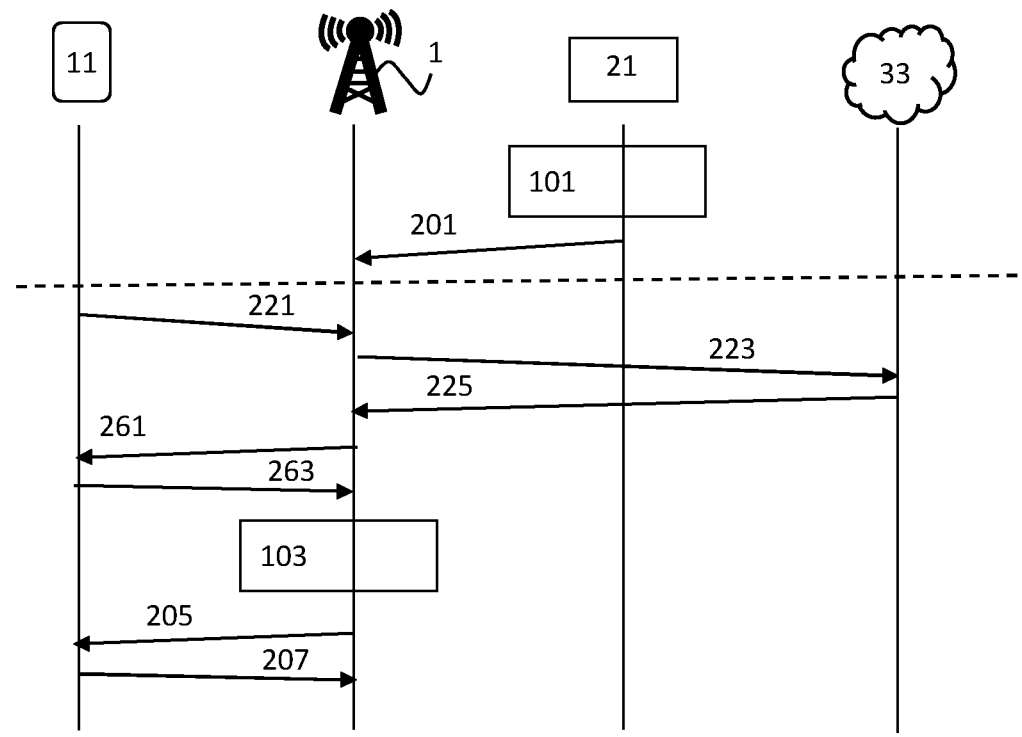
FIG. 10 shows a second example of an adjustment of flow characteristics of a user device-initiated data flow.

FIG. 10 shows a second example of an adjustment of flow characteristics of a user device-initiated data flow. This example is similar to the example of FIG. 8, except that before the base station 1 adjusts the QoS class in step 103, the base station 1 transmits a request 261 to the user device 11. The request 261 requests permission to use the one or more adjusted flow characteristics, i.e. to use the QoS1 class instead of the QoS2 class in this example. The user device 11 then transmits a response 263 to this request 261 and the base station 1 performs step 103, i.e. adjusts the QoS class, in dependence on the response 263 being affirmative.

Next, the base station 1 transmits a message 205 to the user device 11 to establish the QoS flow with, depending on the response 263, the unadjusted QoS class, i.e. the QoS2 class, or the adjusted QoS class, i.e. the QoS1 class, between the base station 1 and the user device 11. Then, the user device 11 transmits a message 207 to the base station 1 to confirm the establishment of the QoS flow with the QoS class specified in message 205.

In the examples of FIGS. 8 and 10, a user device establishes a QoS flow with an application in the core network. Alternatively, a user device may establish a QoS flow with another user device.

Figure 11:
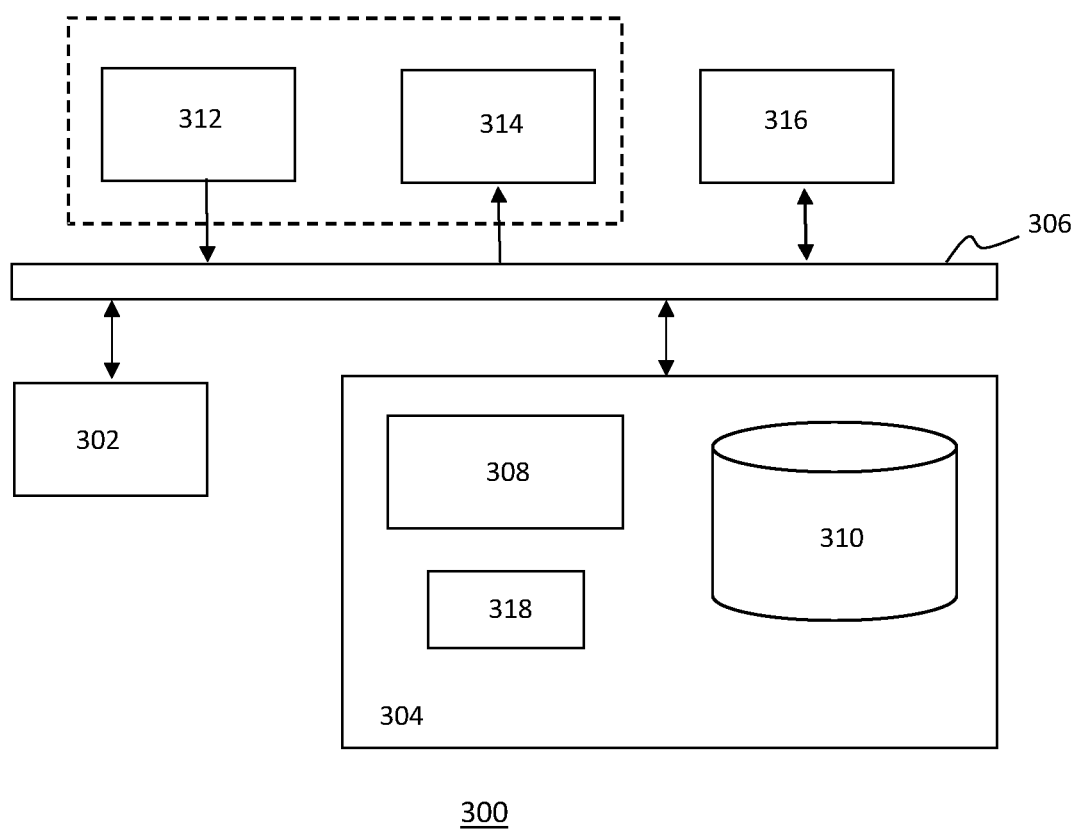
FIG. 11 is a block diagram of an exemplary data processing system for performing the methods of the invention.

FIG. 11 depicts a block diagram illustrating an exemplary data processing system that may perform the method as described with reference to FIGS. 1 and 2.

As shown in FIG. 11, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the number of times program code must be retrieved from the bulk storage device 310 during execution.

Input/output (I/O) devices depicted as an input device 312 and an output device 314 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 11 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 11, the memory elements 304 may store an application 318. In various embodiments, the application 318 may be stored in the local memory 308, he one or more bulk storage devices 310, or separate from the local memory and the bulk storage devices. It should be appreciated that the data processing system 300 may further execute an operating system (not shown in FIG. 11) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for obtaining samples for a dynamic resource management system in a wireless network, the dynamic resource management system using supervised learning to estimate resource demand, the system comprising at least one processor configured to:

analyze data for the dynamic resource management system to determine one or more combinations of input values which are not present or underrepresented in the data, the data comprising a plurality of samples, each of the samples comprising flow characteristics and state and/or cell characteristics as input values and a quantity of resources as output value, adjust one or more flow characteristics of a data flow between a user device and a base station to obtain one of the one or more combinations of input values which are not present or underrepresented in the data, determine a quantity of resources used for the data flow and actual state and/or cell characteristics relevant to the data flow, create a new sample based on the used quantity of resources, the adjusted flow characteristics, and the actual state and/or cell characteristics, and store the new sample in the data.

2. A system as claimed in claim 1, wherein the quantity of resources comprised in the samples as output value is specified per data flow.

3. A system as claimed in claim 1, wherein the flow characteristics include a Quality of Service class selected from a plurality of Quality of Service classes.

4. A system as claimed in claim 3, wherein the at least one processor is configured to select a plurality of characteristics from the flow characteristics and the state and/or cell characteristics for each of the plurality of Quality of Service classes based on the respective Quality of Service class, the selected plurality of characteristics including the respective Quality of Service class, and determine the one or more combinations of input values by determining per Quality of Service class whether a combination of the selected characteristics is not present or underrepresented in the data.

5. A system as claimed in claim 4, wherein the at least one processor is configured to determine per Quality of Service class whether a combination of the selected characteristics is not present or underrepresented in the data by determining per Quality of Service class how many of the samples have a combination of the selected characteristics that deviate less than a certain amount from each other.

6. A system as claimed in claim 3, wherein the plurality of Quality of Service classes includes one or more of: non-guaranteed bit rate, non-delay-critical guaranteed bit rate, and delay-critical guaranteed bit rate.

7. A system as claimed in claim 3, wherein the quantity of resources comprised in the samples as output value is specified per time interval and per slice or cell and the flow characteristics comprise one or more values indicative of at least a number of data flows per Quality of Service class in the time interval.

8. A system as claimed in claim 1, wherein the state and/or cell characteristics include one or more values indicative of one or more of wireless channel conditions, interference levels, throughput, latency, antenna direction, scheduler parameters, and duplex mode.

9. A system as claimed in claim 1, wherein the system comprises a controller and the base station, the controller comprising a first processor and the base station comprising a second processor, the first processor being configured to determine the one or more combinations of input values which are not present or underrepresented in the data and inform the base station of the one or more combinations, and the second processor being configured to adjust the one or more flow characteristics of the data flow to obtain one of the one or more combinations of input values which are not present or underrepresented in the data.

10. A system as claimed in claim 9, wherein the second processor is configured to transmit a message to the user device informing the user device to temporarily use an adjusted flow characteristic for the data flow, the adjusted flow characteristic being comprised in the one or more adjusted flow characteristics.

11. A system as claimed in claim 10, where the message comprises a time interval during which a rule associated with the adjusted flow characteristic is to be used by the user device.

12. A system as claimed in claim 9, wherein the second processor is configured to transmit a request to the user device, the request requesting permission to use the one or more adjusted flow characteristics, receive a response to the request, and adjust the one or more flow characteristics in dependence on the response being affirmative.

13. A system as claimed in claim 1, wherein the at least one processor is configured to cause the adjustment of at least one of the flow characteristics by transmitting a request to a core network function to use the at least one adjusted flow characteristic.

14. A system as claimed in claim 1, wherein the data is training data and the samples are training samples.

15. A user device interacting with a system for obtaining samples for a dynamic resource management system in a wireless network, the dynamic resource management system using supervised learning to estimate resource demand, the system comprising at least one processor configured to:

analyze data for the dynamic resource management system to determine one or more combinations of input values which are not present or underrepresented in the data, the data comprising a plurality of samples, each of the samples comprising flow characteristics and state and/or cell characteristics as input values and a quantity of resources as output value, adjust one or more flow characteristics of a data flow between a user device and a base station to obtain one of the one or more combinations of input values which are not present or underrepresented in the data, determine a quantity of resources used for the data flow and actual state and/or cell characteristics relevant to the data flow, create a new sample based on the used quantity of resources, the adjusted flow characteristics, and the actual state and/or cell characteristics, and store the new sample in the data, and wherein the system further comprises a controller and the base station, the controller comprising a first processor configured to determine the one or more combinations of input values which are not present or underrepresented in the data and inform the base station of the one or more combinations, and the base station comprising a second processor, configured to adjust the one or more flow characteristics of the data flow to obtain one of the one or more combinations of input values which are not present or underrepresented in the data, wherein the user device comprises at least one processor configured to:

receive a message from the base station, the message requesting permission from the user device to use an adjusted flow characteristic for a data flow or informing the user device to temporarily use the adjusted flow characteristic for the data flow, and use a rule associated with the adjusted flow characteristic.

16. A method of obtaining samples for a dynamic resource management system in a wireless network, the dynamic resource management system using supervised learning to estimate resource demand, the method comprising:

analyzing data for the dynamic resource management system to determine one or more combinations of input values which are not present or underrepresented in the data, the data comprising a plurality of samples, each of the samples comprising flow characteristics and state and/or cell characteristics as input values and a quantity of resources as output value;

adjusting one or more flow characteristics of a data flow between a user device and a base station to obtain one of the one or more combinations of input values which are not present or underrepresented in the data;

determining a quantity of resources used for the data flow and actual state and/or cell characteristics relevant to the data flow;

creating a new sample based on the used quantity of resources, the adjusted flow characteristics, and the actual state and/or cell characteristics; and storing the new sample in the data.

17. A computer program product comprising a non-transitory computer-readable medium storing at least one software code portion, the software code portion, when executed by a processor of a computer system, being configured for performing the method of claim 16.

* * * * *